US012682769B2

(12) United States Patent
Huang

(10) Patent No.: US 12,682,769 B2
(45) Date of Patent: Jul. 14, 2026

(54) METHOD AND SYSTEM FOR CONTROLLING FLIGHT DEVICE, STORAGE MEDIUM AND ELECTRONIC DEVICE

(71) Applicant: AUTEL ROBOTICS CO., LTD., Shenzhen (CN)

(72) Inventor: Xiaomeng Huang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 87 days.

(21) Appl. No.: 18/239,538

(22) Filed: Aug. 29, 2023

(65) Prior Publication Data

US 2024/0071234 A1 Feb. 29, 2024

(30) Foreign Application Priority Data

Aug. 29, 2022 (CN) ......................... 202211041664.3

(51) Int. Cl.
*G08G 5/34* (2025.01)
*G08G 5/26* (2025.01)

(52) U.S. Cl.
CPC ................. *G08G 5/34* (2025.01); *G08G 5/26* (2025.01)

(58) Field of Classification Search
CPC ........ G08G 5/34; G08G 5/26; H10F 77/1692; H10H 29/922; H10H 29/39; H10D 30/0327; H10D 64/311; H10D 84/0126; H10D 84/977; H04B 7/155; H04B 7/18504; H04W 4/42; A23B 45/70; B65D 83/204; G05D 1/101
USPC .................... 701/3, 120, 448, 528; 244/152; 340/425.1; 370/316
See application file for complete search history.

(56) References Cited

U.S. PATENT DOCUMENTS

| | | | | |
|---|---|---|---|---|
| 2011/0118907 | A1* | 5/2011 | Elkins | B64B 1/00 |
| 2012/0089276 | A1* | 4/2012 | Grabowsky | H04B 7/18504 |
| 2017/0088261 | A1* | 3/2017 | Sequeira | G01S 13/0209 |

(Continued)

FOREIGN PATENT DOCUMENTS

| | | | |
|---|---|---|---|
| CN | 106941372 | A | 7/2017 |
| CN | 108496133 | A | 9/2018 |

(Continued)

OTHER PUBLICATIONS

The First CNOA issued in CN Application: 202211041664.3 dated Dec. 27, 2024 with English Translation, (13p).

*Primary Examiner* — Ellis B. Ramirez
(74) *Attorney, Agent, or Firm* — Arch & Lake LLP

(57) ABSTRACT

A method and a system for controlling a flight device, a storage medium and an electronic device are provided. The method includes: acquiring a mission flight route of a first flight device, where the mission flight route is configure to indicate a flight route of a data acquisition mission to be performed by the first flight device; generating a relay flight route of the second flight device according to the mission flight route and a relay base station distribution on the mission flight route, where the relay flight route is configured to indicate a flight route of the second flight device during execution of the data acquisition mission by the first flight device; and controlling the first flight device to perform the data acquisition mission according to the mission flight route and controlling the second flight device to perform the data acquisition mission according to the relay flight route.

18 Claims, 8 Drawing Sheets

(56) References Cited

U.S. PATENT DOCUMENTS

| | | | | |
|---|---|---|---|---|
| 2017/0101179 | A1* | 4/2017 | Michael | B64D 17/78 |
| 2018/0319495 | A1* | 11/2018 | Tu | H04B 7/18504 |
| 2019/0086938 | A1* | 3/2019 | Shattil | G05D 1/227 |
| 2019/0354117 | A1* | 11/2019 | Sakaguchi | G01S 19/14 |
| 2020/0304200 | A1* | 9/2020 | Ma | H04B 7/18519 |
| 2021/0119692 | A1* | 4/2021 | Kuo | G05D 1/0027 |
| 2022/0103246 | A1* | 3/2022 | Chai | H04B 7/18504 |
| 2022/0244745 | A1* | 8/2022 | Bisht | G08G 5/0039 |

FOREIGN PATENT DOCUMENTS

| | | | |
|---|---|---|---|
| CN | 111865395 | A | 10/2020 |
| CN | 114911255 | A | 8/2022 |
| EP | 0837567 | A2 * | 4/1998 |
| WO | 2019041633 | A1 | 3/2019 |

* cited by examiner

METHOD AND SYSTEM FOR CONTROLLING FLIGHT DEVICE, STORAGE MEDIUM AND ELECTRONIC DEVICE

CROSS REFERENCE TO RELATED DISCLOSURE

This application is filed based upon and claims priority to Chinese patent application 202211041664.3, filed on Aug. 29, 2022 and entitled "Method and system for controlling flight device, storage medium and electronic device," the entire disclosure of which is incorporated herein by reference for all purposes.

RELATED ART

With the wide disclosure of flight devices, Unmanned Aerial Vehicles (UAVs) are used in reconnaissance, border defense, rescue and other fields. The Unmanned Aerial Vehicles (UAVs) communicate with the ground through an Ad Hoc network link, which however, is vulnerable to environmental impact. Therefore, in the current technology, the UAVs connect relay base stations and form a link to expand the communication range of the UAVs, but in the working process of the UAVs, the flight route will be limited by the range of relay base stations, so that the UAVs can only fly along a single linear direction of the relay base stations.

There is no effective solution to the problem of small communication coverage of flight device in the related art.

SUMMARY

Embodiments of the present disclosure relate to the technical field of aircraft, in particular to a method and a system for controlling a flight device, a storage medium and an electronic device.

Embodiments of the present disclosure provide a method and a system for controlling a flight device, a storage medium and an electronic device to at least solve the related art problem of small communication coverage of flight device.

According to a first aspect of the present disclosure, a method for controlling a flight device is provided, which includes:

- acquiring a mission flight route of a first flight device, where the mission flight route is used for indicating a flight route of a data acquisition mission to be performed by the first flight device;
- generating a relay flight route of the second flight device according to the mission flight route and a relay base station distribution on the mission flight route, where the relay flight route is used for indicating a flight route of the second flight device during execution of the data acquisition mission by the first flight device; and
- controlling the first flight device to perform the data acquisition mission according to the mission flight route and controlling the second flight device to perform the data acquisition mission according to the relay flight route, where the first flight device is communicatively connected to the second flight device during the execution of the data acquisition mission, and the second flight device is communicatively connected to a target relay base station device in the relay base station distribution.

According to a second aspect of the present disclosure, a system for controlling a flight device includes: a control device, a first flight device, a second flight device and a relay base station distribution, where the first flight device is communicatively connected to the second flight device during the execution of the data acquisition mission, and the second flight device is communicatively connected to a target relay base station device in the relay base station distribution;

- the control device is used for acquiring a mission flight route of a first flight device, where the mission flight route is used for indicating a flight route of a data acquisition mission to be performed by the first flight device; generating a relay flight route of the second flight device according to the mission flight route and relay base station distribution on the mission flight route, where the relay flight route is used for indicating a flight route of the second flight device during execution of the data acquisition mission by the first flight device; and controlling the first flight device to perform the data acquisition mission according to the mission flight route and controlling the second flight device to perform the data acquisition mission according to the relay flight route;
- the first flight device is used for acquiring mission data during execution of the data acquisition mission;
- the second flight device is used for transmitting the mission data acquired by the first flight device; and
- the target relay base station is used for transmitting the mission data transmitted by the second flight device.

According to a third aspect of the present disclosure, a non-transitory computer readable storage medium having stored therein a computer program is further provided, where the computer program is arranged to perform the steps according to the first aspect when run.

According to a fourth aspect of the present disclosure, an electronic device is further provided, which includes a memory and a processor, the memory having stored therein a computer program, the processor being arranged to run the computer program to perform the steps according to the first aspect above.

DETAILED DESCRIPTION

Hereinafter, embodiments of the present disclosure will be described in detail in conjunction with the embodiments with reference to the accompanying drawings.

It is noted that the terms "first," "second," and the like in the specification, claims and the above-mentioned figures of this application are used for distinguishing between similar objects and not necessarily for describing a particular sequential or chronological order.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
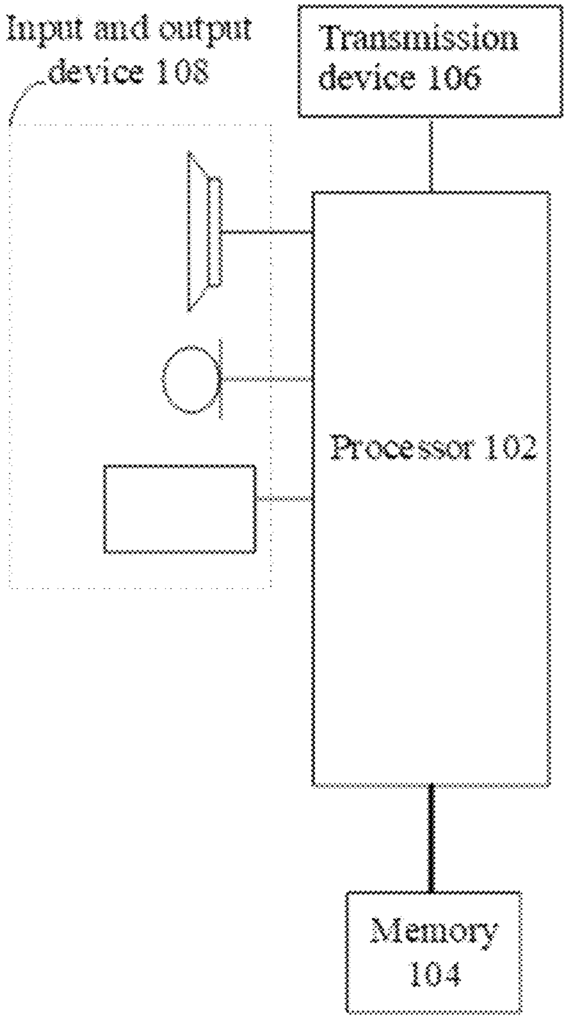
FIG. 1 is a block diagram of a hardware structure of a mobile terminal of a method for controlling a flight device according to an embodiment of the present disclosure.

The method embodiments provided in the embodiments of the present disclosure may be implemented in a mobile terminal, a computer terminal or a similar computing device. Taking operation on a mobile terminal as an example, FIG. 1 is a block diagram of a hardware structure of a mobile terminal of a method for controlling a flight device according to an embodiment of the present disclosure. As shown in FIG. 1, a mobile terminal may include one or more (only one shown in FIG. 1) processors 102 (which may include, but are not limited to, processing devices such as a microprocessor MCU or a programmable logic device FPGA) and a memory 104 for storing data, where the mobile terminal may further include a transmission device 106 for communication functions and an input output device 108. It will be understood by a person skilled skill in the art that the configuration shown in FIG. 1 is merely illustrative and does not limit the configuration of the mobile terminal described above. For example, the mobile terminal may also include more or fewer components than shown in FIG. 1, or have a different configuration than shown in FIG. 1.

The memory 104 may be used to store computer programs, e.g., software programs and modules of disclosure software, and computer programs corresponding to the method for controlling the flight device in the embodiment of the present disclosure, and the processor 102 executes the computer programs stored in the memory 104 to perform various functional disclosures and data processing, i.e., to implement the method described above. The memory 104 may include a high-speed random access memory, and may also include a non-volatile memory, such as one or more magnetic storage devices, a flash memory, or other non-volatile solid-state memories. In some instances, the memory 104 may further include a memory remotely located with respect to the processor 102, which may be connected to the mobile terminal via a network. Examples of such networks include, but are not limited to, the Internet, intranets, local area networks, mobile communication networks, and combinations thereof.

The transmission device 106 is adapted to receive or transmit data via a network. Specific examples of the networks described above may include wireless networks provided by communication providers of mobile terminals. In one example, the transmission device 106 includes a Network Interface Controller (NIC) that may be coupled to other network devices through a base station to communicate with the Internet. In one example, the transmission device 106 may be a Radio Frequency (RF) module configured to communicate wirelessly with the Internet.

Figure 2:
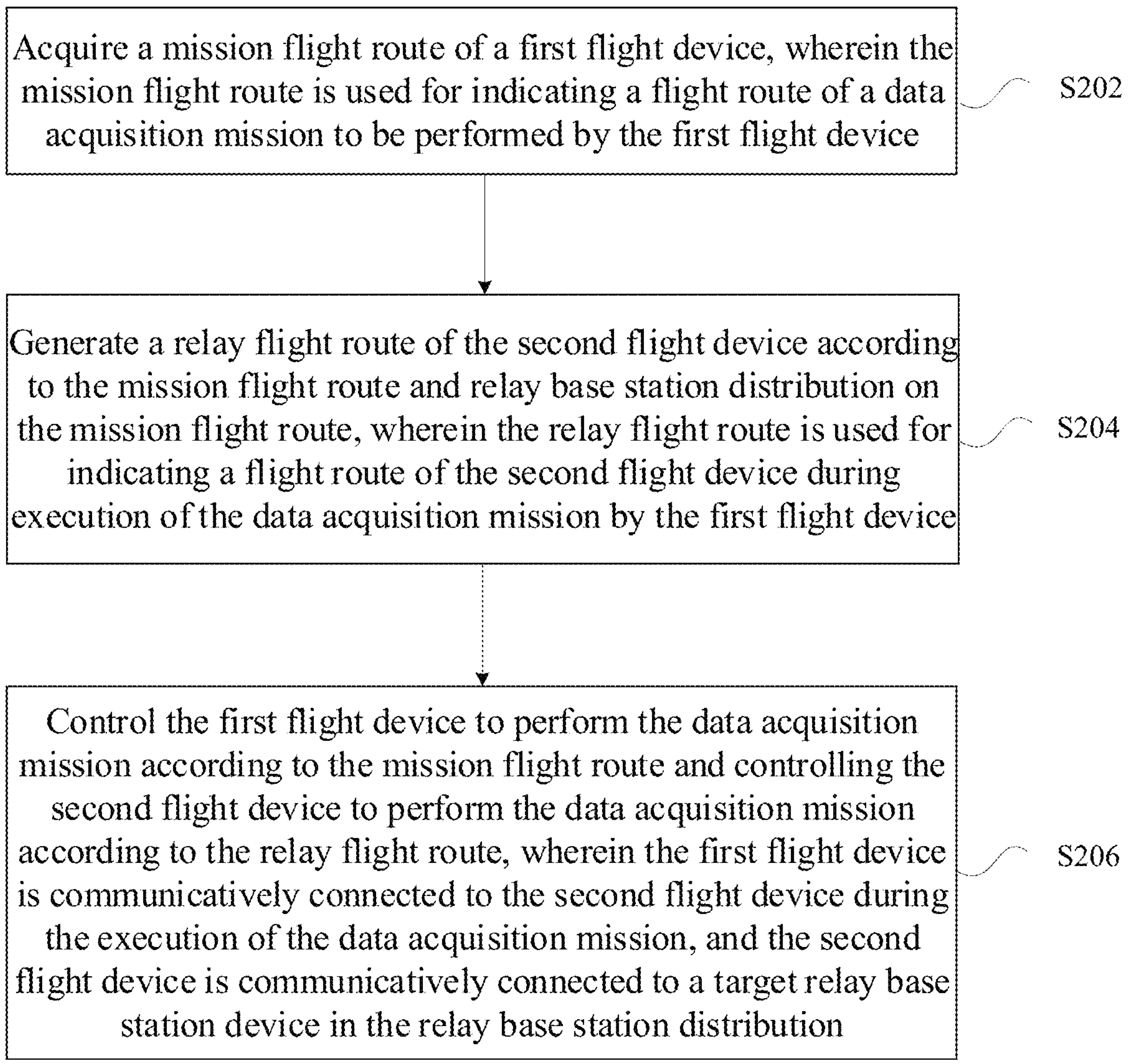
FIG. 2 is a flow chart of a method for controlling a flight device according to an embodiment of the present disclosure.

In this embodiment, a method for controlling a flight device is provided. FIG. 2 is a flow chart of the method for controlling a flight device according to an embodiment of the present disclosure. As shown in FIG. 2, the flow chart includes the following steps:

S202: acquiring a mission flight route of a first flight device, where the mission flight route is used for indicating a flight route of a data acquisition mission to be performed by the first flight device;

S204: generating a relay flight route of the second flight device according to the mission flight route and relay base station distribution on the mission flight route, where the relay flight route is used for indicating a flight route of the second flight device during execution of the data acquisition mission by the first flight device; and

S206: controlling the first flight device to perform the data acquisition mission according to the mission flight route and controlling the second flight device to perform the data acquisition mission according to the relay flight route, where the first flight device is communicatively connected to the second flight device during the execution of the data acquisition mission, and the second flight device is communicatively connected to a target relay base station device in the relay base station distribution.

By means of the present disclosure, firstly, a mission flight route of a first flight device which is to perform a data acquisition mission is acquired, and relay base station distribution is provided on the mission flight route; then a flight route is generated as a relay flight route for a second flight device according to the mission flight route and the relay base station distribution on the mission flight route; and finally, the first flight device and the second flight device are controlled to perform the data acquisition mission according to respective flight routes. During the execution of the data acquisition mission, a communication connection is made between the first flight device and the second flight device, and the communication connection is made between the second flight device and the target relay base station equipment in the relay base station distributions to form a network for data transmission and communication to ensure the back transmission of information during the execution of the data acquisition mission. In the process of controlling the first flight device to perform the data acquisition mission, the effect of extending the transmission distance of the first flight device is achieved by using the second flight device and the relay base station to transmit the data information, and since the second flight device cooperates with the first flight device to perform the relay transmission of the data information during the data acquisition mission, the restriction on the flight route of the first flight device by the relay base station is reduced. Therefore, the problem of small communication coverage of the flight device can be solved, and the effect of extending the communication coverage of the flight device can be achieved.

Alternatively, in this embodiment, the method for controlling the flight device described above may be applied to, but is not limited to, a product or program having a control function of the flight device. For example: a central processor of the flight device, a remote control terminal of the flight device, or a program deployed on these products.

In the solution provided by the above-mentioned step S202, the above-mentioned flight device may be, but is not limited to, any type of aircraft that is allowed to have a data transmission function. For example: unmanned aerial vehicles, conventional aircraft and the like. The above-mentioned first flight device is a flight device for executing a data acquisition mission, and the above-mentioned second flight device is a flight device for providing a data relay service for the first flight device together with a relay base station in the process of the first flight device executing the data acquisition mission. For example: the first flight device may be a mission unmanned aerial vehicle (UAV), and the second flight device may be a relay UAV; and in the process of the mission UAV executing the data acquisition mission, the relay UAV and the relay base station together provide a relay service for the mission UAV, so that the data acquired by the mission UAV or the information to be transmitted can be sent back in time.

Alternatively, in this embodiment, the mission flight route is the flight route of the first flight device for performing the data acquisition mission. It can be, but is not limited to, manually set in advance, such as: the crew member may designate the flight route of the first flight device as the mission flight route. Alternatively, but not limited to, the mission flight route may be automatically planned based on the mission content of the data acquisition mission, such as: a staff can plan the data acquisition points of the data acquisition missions to be performed, and can automatically generate the flight route of the missions according to the information of the location and execution sequence of the data acquisition points.

In the solution provided by the above step S204, the relay flight route is a flight route of a second flight device for providing a relay service for the first flight device during execution of the data acquisition mission. The relay flight route may be, but is not limited to, a flight route generated for the second flight device based on the mission flight route and relay base station distribution on the mission flight route that can reasonably provide relay services to the first flight device to extend the scope of the mission performed by the first flight device.

Alternatively, in this embodiment, the relay base stations may be, but are not limited to, ground-deployed communication equipment for transmitting signals for flight device, and the relay base station distribution on the mission flight route may include, but are not limited to, one or more relay base stations, which may be dispersed for a plurality of relay base stations, the relay base stations being interconnected to form a communication network. Relay base station distribution may, but is not limited to, refer to relay base stations that provide relay services for data acquisition missions performed by the first flight device during the performance of the missions. Relay base station distribution on the flight route of the missions may, but is not limited to, refer to relay services that may provide data information and the like for the data acquisition missions, either alone or through a network connection between each other, during the performance of the missions by the first flight device.

In one embodiment, depending on the mission flight route and the relay base station distribution on the mission flight route, a relay flight route for the second flight device may be generated, but is not limited to, in the following manner: acquiring a relay base station falling within a range where the mission flight route is located from a relay base station network to obtain the relay base station distribution; planning the relay flight route according to the mission flight route within a range covered by the relay base station distribution.

Figure 3:
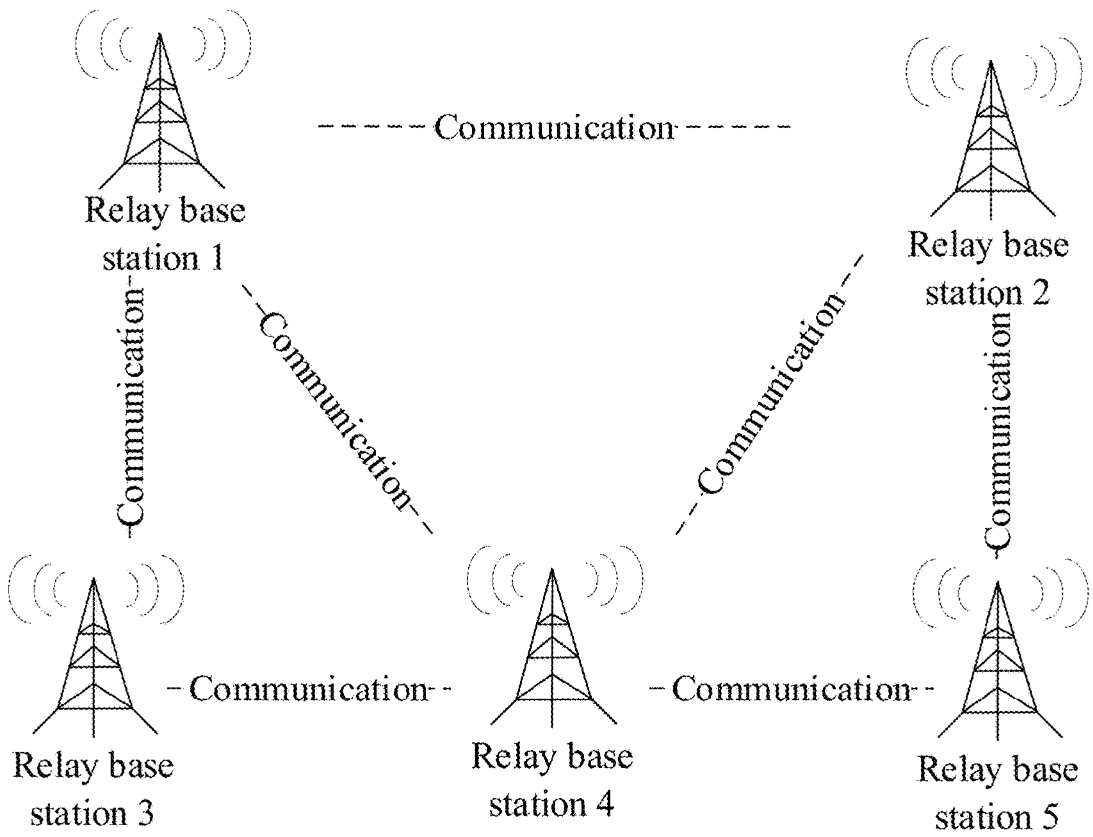
FIG. 3 is a schematic diagram of a relay base station network according to an embodiment of the present disclosure.

Alternatively, in this embodiment, the relay base station network may be, but is not limited to, a communication network formed between ground-deployed base station devices that provide data transmission services for flight device, such as: each base station device can cover a certain communication range, and a plurality of base station devices can establish a communication connection with each other to obtain a larger communication range and cover a larger area. FIG. 3 is a schematic diagram of a relay base station network according to an embodiment of the present disclosure. As shown in FIG. 3, a relay base station 1, a relay base station 2, a relay base station 3, a relay base station 4 and a relay base station 5 are distributed and deployed in the relay base station network, and they establish a communication connection with each other to provide a relay service for data transmission of flight device. There may be, but is not limited to, a relay base station 1, a relay base station 2 and a relay base station 3 on a mission flight route of a first flight device, thereby forming relay base station distribution on the mission flight route, and then planning a relay flight route for a second flight device according to the mission flight route within the range covered by the relay base station distribution.

In an embodiment, the relay flight route can be planned, but not limited to, according to the mission flight route in a range covered by the relay base station distribution: determining a reference relay base station corresponding to each mission position on the mission flight route in the relay base station distribution; determining an optimal relay position corresponding to each mission position within a range covered by the reference relay base station, and obtaining the relay flight route.

Alternatively, in this embodiment, each mission position on the mission flight route may be, but is not limited to, individually determined along the mission flight route in certain unit steps, such as: a mission position is determined every meter, centimeter or two meters. Alternatively, each mission position on the mission flight route may be, but is not limited to, a plurality of key locations selected on the mission flight route, such as: the position of the inflection point on the mission flight route, the position on the mission flight route that falls at an edge of the coverage area of the relay base station and the like may be used as the mission position.

Alternatively, in this embodiment, the connection mode of the relay base station corresponding to the mission flight route can be determined by determining the reference relay base station corresponding to each mission position in the relay base station distribution, i.e., each mission position can be connected to one reference relay base station, and the relay flight route can ensure such connection.

Alternatively, in this embodiment, the optimal relay position may be, but is not limited to, determining according to a preset preference rule after determining a reference relay base station according to each mission position of the mission flight route, such as: taking the optimal distance selection rule as an example, the connection between the mission flight route and the reference relay base station is a plane, each midpoint between corresponding edge points of the plane is acquired, the optimal relay position is determined, and the connection optimal relay position is the relay flight route.

Figure 4:
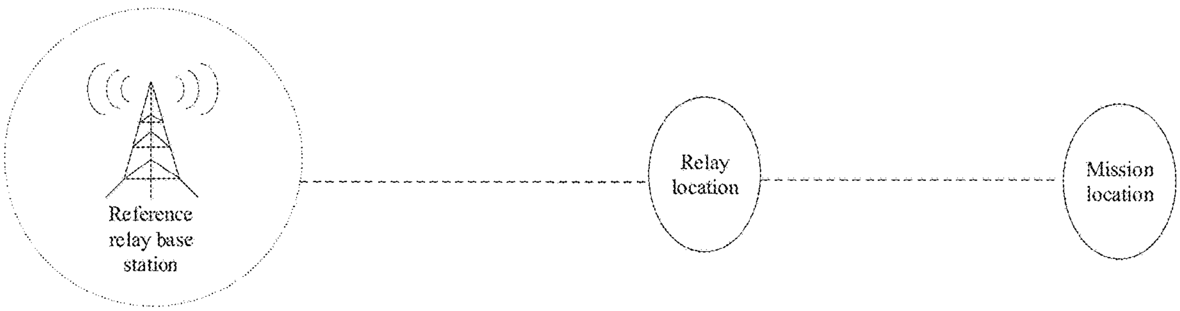
FIG. 4 is a schematic diagram of a connection relationship between a mission position, a relay location and a reference relay base station according to an embodiment of the present disclosure.

FIG. 4 is a schematic diagram of a connection relationship between a mission position, a relay location and a reference relay base station according to an embodiment of the present disclosure, and as shown in FIG. 4, the relay location can be determined on a connection line between the mission position and its corresponding reference relay base station. A relay flight route can be obtained by connecting the relay positions corresponding to each mission position in turn.

In the technical solution provided in the above-mentioned step S206, a first flight device can be controlled to perform a data acquisition mission according to a flight route of the mission by means of a mobile terminal, a computer, a control handle and the like and a second flight device performs a data acquisition mission according to a relay flight route.

Alternatively, in this embodiment, a communication connection is made between the first flight device and the second flight device and between the second flight device and a target relay base station device in the relay base station distribution during the data acquisition mission, thereby enabling the content, such as data information, of the first flight device to be transmitted to the relay base station via the second flight device and then to a device requiring such content via the relay base station.

Alternatively, in this embodiment, the data acquisition missions may include, but are not limited to: data acquisition missions in the fields of aerial photography, reconnaissance, transportation, sea surveillance, real-time relay/on-site monitoring, power line patrol, pipeline patrol, animal and plant protection and the like.

Alternatively, in this embodiment, the data acquired in the data acquisition mission may include, but is not limited to: video data, voice data, picture data, and the like.

Alternatively, in this embodiment, the manner of communication connection between the flight devices or between the flight devices and the relay base station may include, but is not limited to, the following: Bluetooth, Wireless Communication Technology (WIFI), a wireless network protocol for low-speed short-range transmission (ZIGBEE), 5th Generation Mobile Communication Technology (5G) and other wireless transmission technologies.

In one embodiment, the first flight device may be controlled to perform data acquisition missions according to the mission flight route and the second flight device may perform data acquisition missions according to the relay flight route in the following manner, but is not limited to: controlling the first flight device and the second flight device to take off simultaneously at the same place; and acquiring mission data transmitted by the target relay base station during execution of the data acquisition mission by the first flight device according to the mission flight route, where the mission data acquired by the first flight device is transmitted to the target relay base station via the second flight device.

Alternatively, in this embodiment, it may be, but is not limited to controlling the first flight device and the second flight device via a mobile terminal (e.g., a mobile phone, a handle and the like), and viewing data information returned by the first flight device.

Alternatively, in this embodiment, by controlling the first flight device and the second flight device to take off simultaneously at the same place, it is possible to ensure that the first flight device and the second flight device use the battery simultaneously, ensuring that both maintain a consistent battery endurance, and thus operate efficiently.

Alternatively, in this embodiment, it is also possible, but not limited to, controlling the first flight device and the second flight device to land simultaneously at the same place, or land at different places simultaneously, so that it can be ensured that the first flight device and the second flight device change the battery simultaneously to reduce the waiting time, thereby operating efficiently.

Figure 5:
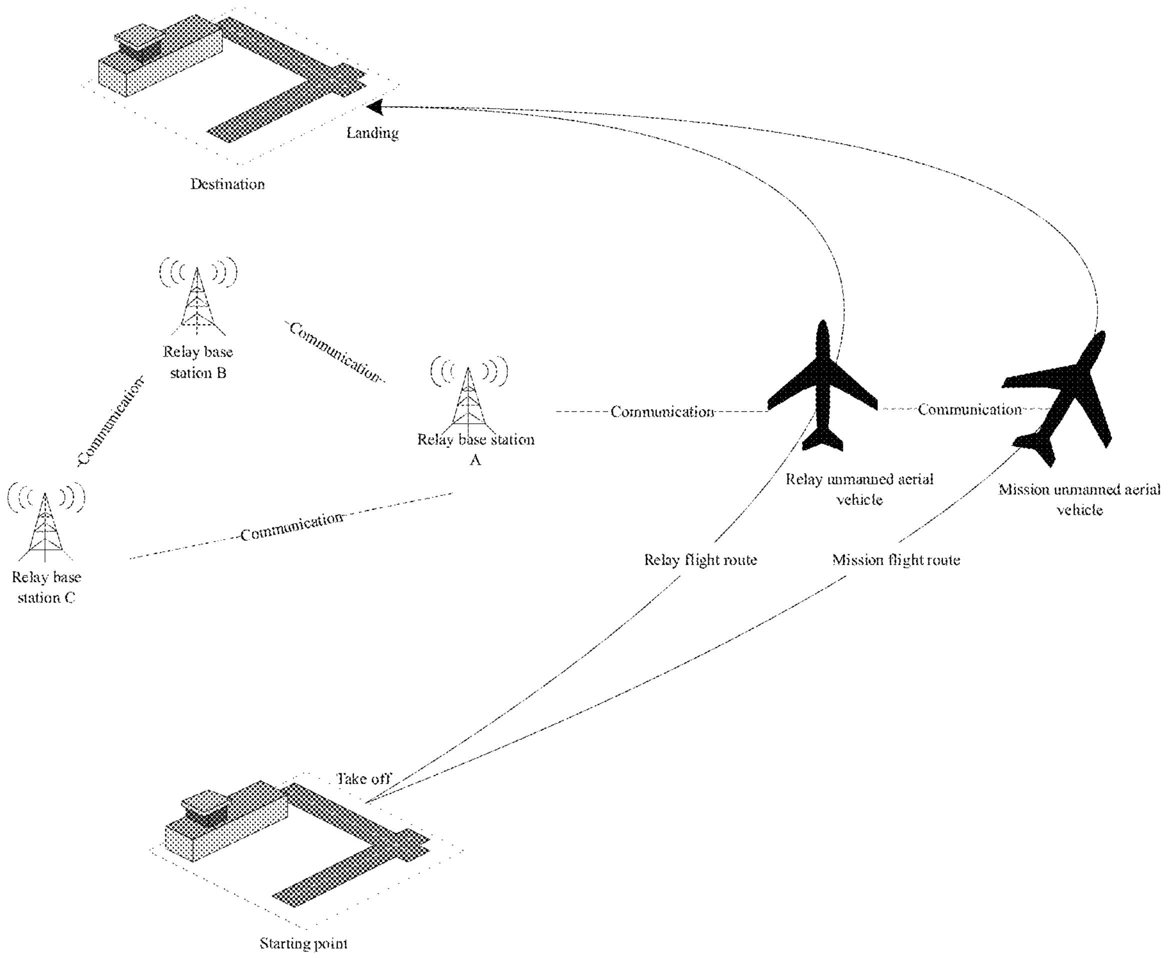
FIG. 5 is a schematic diagram of a process for performing a data acquisition mission according to an embodiment of the present disclosure.

Alternatively, in this embodiment, FIG. 5 is a schematic diagram of a process of executing a data acquisition mission according to an embodiment of the present disclosure; as shown in FIG. 5, taking a first flight device as a mission unmanned aerial vehicle and a second flight device as a relay unmanned aerial vehicle as an example, a relay flight route can be generated for the relay unmanned aerial vehicle after acquiring a mission flight route of the mission unmanned aerial vehicle, and the aerial flight devices flying by the two flight routes can take off or land simultaneously at the same place; the first flight device transmits data to the second flight device by communicating with the second flight device; and the second flight device transmits the data transmitted by the first flight device to a relay base station A connected thereto at this time, and the relay base station A continues to transmit data to a data receiving device on the ground to complete a data acquisition mission.

In one embodiment, during execution of the data acquisition mission by the first flight device according to the mission flight route, the flight range of the first flight device can be detected, but is not limited to: identifying a base station identifier of the target relay base station; and detecting a flight range where the first flight device is located according to the base station identifier.

Alternatively, in this embodiment, the deployment position of each relay base station is known, the base station identification of the target relay base station currently providing data relay service for the flight device can be identified to obtain the deployed position of the target relay base station, and the flight range in which the first flight device is located can be determined according to the position.

Figure 6:
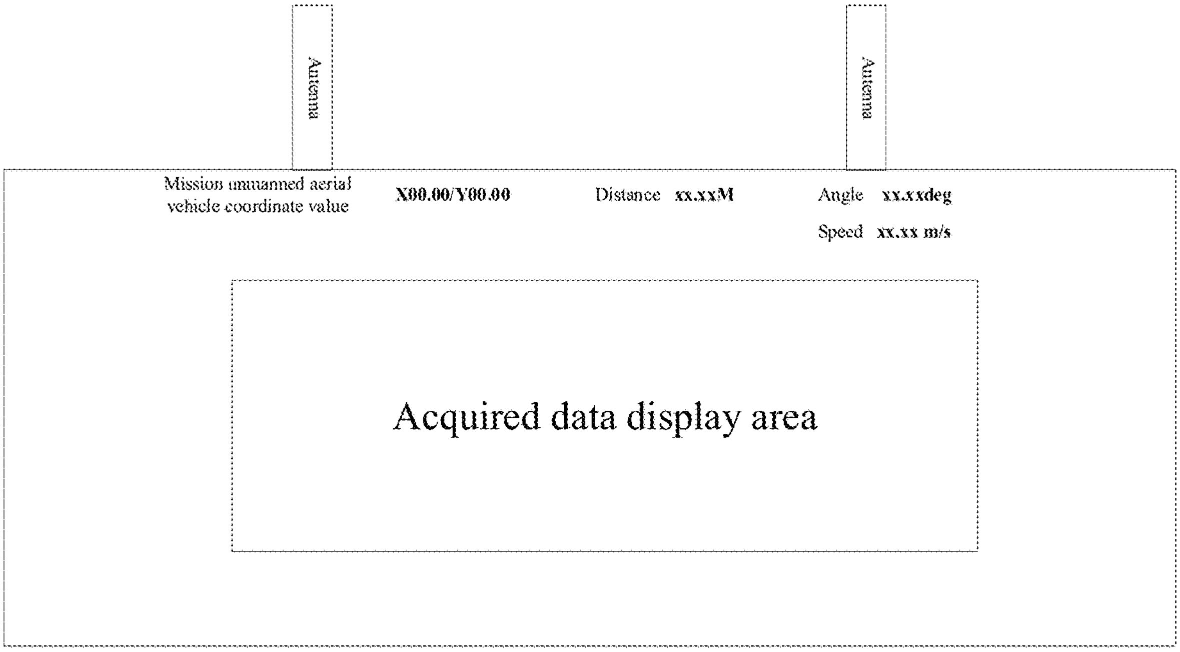
FIG. 6 is a schematic diagram of acquiring a flight range of a first flight device according to an embodiment of the present disclosure.

Alternatively, in this embodiment, FIG. 6 is a schematic diagram for acquiring the flight range of the first flight device according to the embodiment of the present disclosure, and as shown in FIG. 6, according to the unique identifier of the target relay base station to which the relay unmanned aerial vehicle is currently connected, the flight range in which the mission unmanned aerial vehicle is located can be detected, so that the position information such as the coordinate value (or coordinate range) and distance of the mission unmanned aerial vehicle can be displayed on the control handle of the flight device.

In one embodiment, during execution of the data acquisition mission by the first flight device according to the mission flight route, the flight routes of the two flight devices may be re-planned in a way not limited to: acquiring data state information transmitted by the target relay base station, where the data state information is used for indicating a transmission state of data between the first flight device, the second flight device and the target relay base station during the execution of the data acquisition mission; re-planning the first alternative flight route and the second alternative flight route based on the data state information; controlling the first flight device and the second flight device to continue to perform the data acquisition mission following the first alternative flight route and the second alternative flight route respectively.

Alternatively, in this embodiment, the data state information is used for indicating the status of data transmission between the first flight device, the second flight device, and the target relay base station during performance of the data acquisition mission. Automatic adjustment of the flight route of the flight device can be achieved according to the transmission state, for example: and if a signal instability occurs on a transmission link formed by the first flight device, the second flight device and the target relay base station, a first alternative flight route can be planned for the first flight device again, and a second alternative flight route can be planned for the second flight device according to the first alternative flight route, and the first flight device and the second flight device are controlled to continue executing the data acquisition mission according to the first alternative flight route and the second alternative flight route respectively to ensure smooth execution of the data acquisition mission.

Alternatively, in this embodiment, the data state information may include, but is not limited to, the operational status of the flight device, the operational status of the relay base station and the like. The data transmission status of the communication link can be detected by monitoring the data state information to determine whether a new flight route needs to be planned based on the data transmission status.

Figure 7:
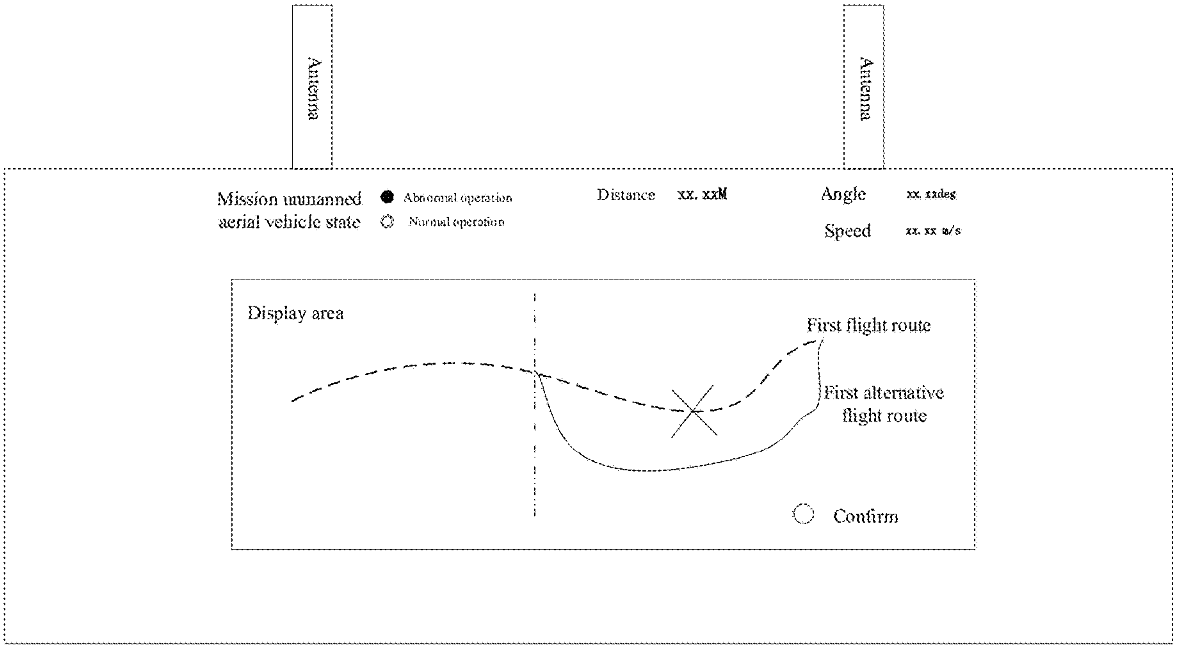
FIG. 7 is a schematic diagram of planning a flight route for an alternative flight device according to an embodiment of the present disclosure.

Alternatively, in this embodiment, FIG. 7 is a schematic diagram for planning a flight route of an alternative flight device according to an embodiment of the present disclosure; as shown in FIG. 7, a working state of a mission unmanned aerial vehicle can be displayed on a control handle as the above-mentioned data state information, i.e., working abnormally or working normally; when it is displayed as working abnormally, a first alternative flight route can be re-planned for the mission unmanned aerial vehicle on a display area on the control handle, and a second alternative flight route can be regenerated; and according to the re-planned route, two flight devices can be controlled to continue to perform a data acquisition mission.

In one embodiment, the first flight device and the second flight device may be controlled to take off simultaneously at the same place in a way not limited to: acquiring, from the relay base station distribution, a to-be-tested relay base station which is farthest away from the take-off position of the data acquisition mission; transmitting a test signal to the to-be-tested relay base station; controlling the first flight device and the second flight device to take off simultaneously from the take-off position upon receiving feedback information returned by the to-be-tested relay base station in response to the test signal.

Alternatively, in this embodiment, prior to controlling the two flight devices to perform the data acquisition mission, a self-test of the link of the relay base station may be achieved by, but not limited to, signal detection of the to-be-tested relay base station as described above, thereby ensuring that the link is clear and improving the success rate of mission execution.

Alternatively, in this embodiment, the test signal may be, but is not limited to, a signal that the relay base station can recognize and return a particular instruction. The relay base station which is farthest away from the take-off position of the data acquisition mission can return feedback information according to the test signal, i.e. can indicate that the communication links distributed throughout the relay base station are smooth, and can support the execution of the data acquisition mission.

Figure 8:
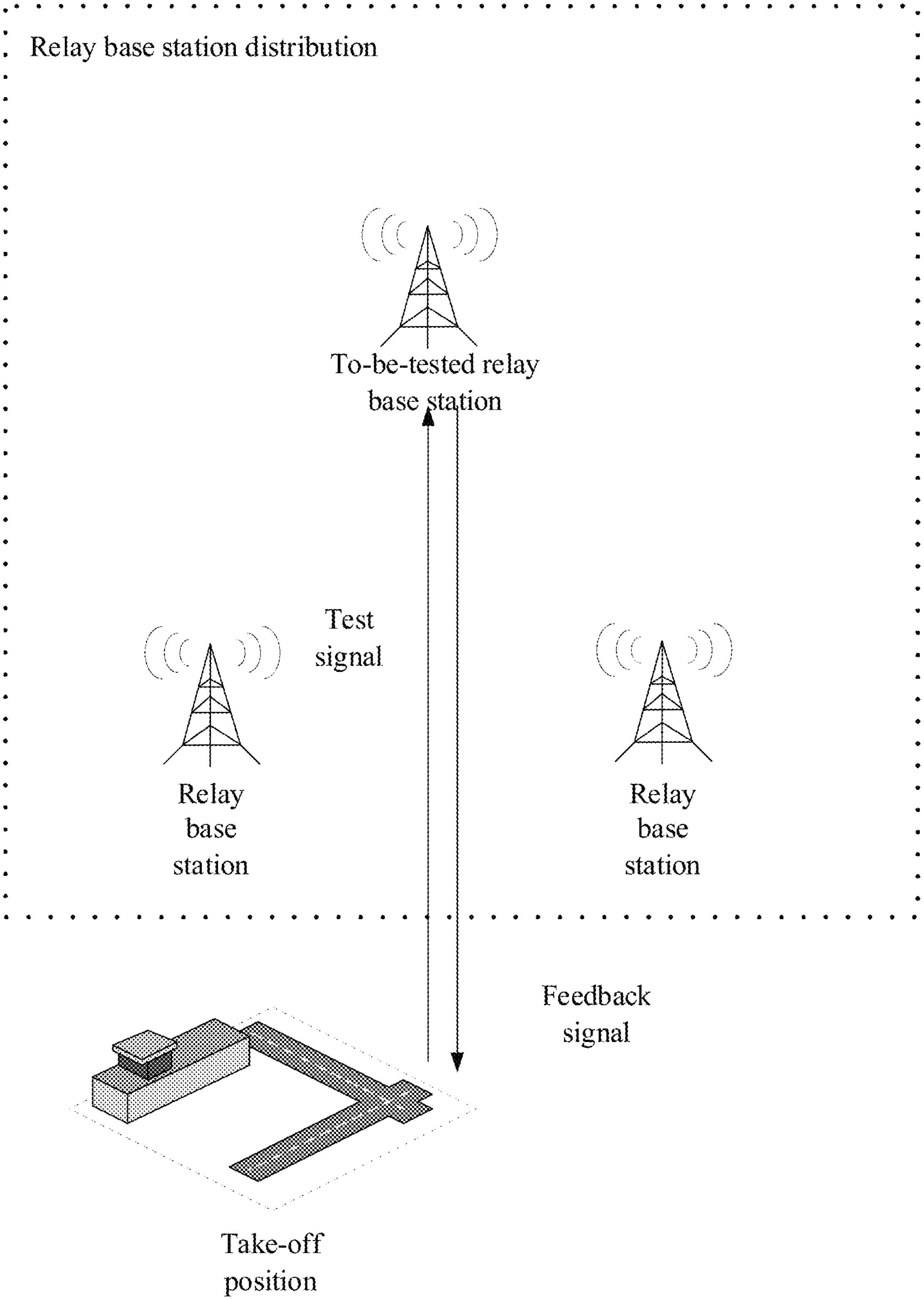
FIG. 8 is a schematic diagram of detecting a link working state of a base station according to an embodiment of the present disclosure.

Alternatively, in this embodiment, FIG. 8 is a schematic diagram of detecting the link operating state of a base station according to an embodiment of the present disclosure, and as shown in FIG. 8, before an unmanned aerial vehicle performs a data acquisition mission, a link self-detection of a relay base station can be performed by transmitting a test signal to a to-be-tested relay base station which is farthest away from the take-off position of the data acquisition mission in the relay base station distribution to ensure that the link is clear.

Through the above embodiments, the problem can be solved that the mission unmanned aerial vehicle and the wireless transmission link are blocked by the surrounding objects of the ground relay base station, the lateral flight distance cannot be extended, and the mission can only be performed towards a single straight line route where the relay base station has been arranged. It not only achieves a good wireless environment in the air without obstruction, greatly increases the cruising range, and is flexible in networking, so it is very convenient to choose the best relay base station to work, and achieve regional coverage.

From the description of the embodiments given above, it will be clear to a person skilled in the art that the method according to the embodiments described above can be implemented by means of software plus a necessary general hardware platform, but of course also by means of hardware, but in many cases the former is a better embodiment. Based on such an understanding, the technical solution of the present disclosure, either substantively or in any way contributing to the prior art, can be embodied in the form of a software product, wherein the computer software product is stored in a storage medium (such as a ROM/RAM, a magnetic diskette, an optical disk), and includes instructions for causing a terminal device (which can be a mobile phone, a computer, a server, or a network device, etc.) to execute the method of various embodiments of the present disclosure.

Figure 9:
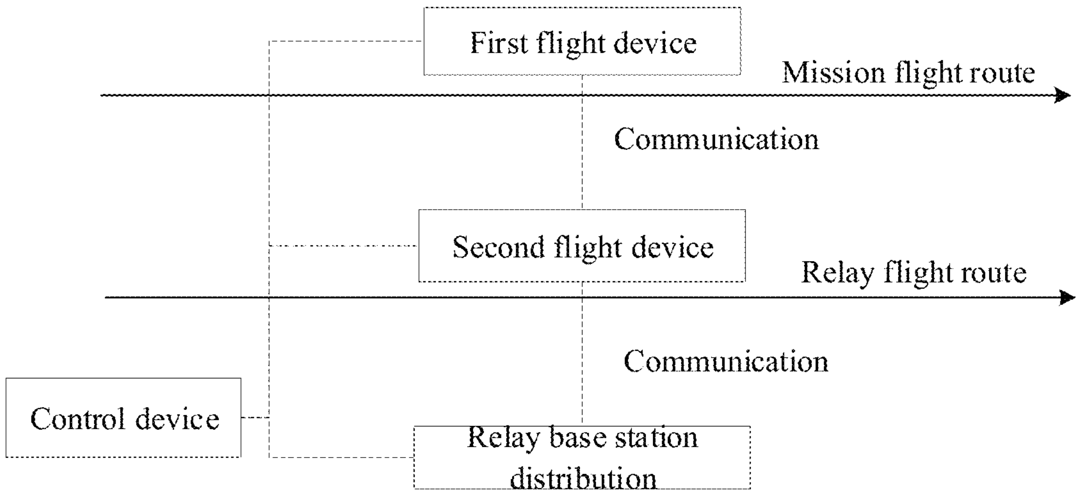
FIG. 9 is a schematic diagram of a system for controlling a flight device according to an embodiment of the present disclosure.

A system for controlling a flight device is further provided in this embodiment, and FIG. 9 is a schematic diagram of a system for controlling a flight device according to an embodiment of the present disclosure, as shown in FIG. 9, the system includes: a control device, a first flight device, a second flight device and relay base station distribution, the first flight device is communicatively connected to the second flight device during the execution of the data acquisition mission, and the second flight device is communicatively connected to a target relay base station device in the relay base station distribution.

Furthermore, the control device is used for acquiring a mission flight route of a first flight device, where the mission flight route is used for indicating a flight route of a data acquisition mission to be performed by the first flight device; generating a relay flight route of the second flight device according to the mission flight route and relay base station distribution on the mission flight route, where the relay flight route is used for indicating a flight route of the second flight device during execution of the data acquisition mission by the first flight device; and controlling the first flight device to perform the data acquisition mission according to the mission flight route and controlling the second flight device to perform the data acquisition mission according to the relay flight route.

Moreover, the first flight device is used for acquiring mission data during execution of the data acquisition mission; the second flight device is used for transmitting the mission data acquired by the first flight device; and the target relay base station is used for transmitting the mission data transmitted by the second flight device.

Alternatively, in this embodiment, the flight device described above may be, but is not limited to, any type of aircraft that allows data transmission capabilities. For example: unmanned aerial vehicles, conventional aircraft and the like.

Alternatively, in this embodiment, the relay base stations may be, but are not limited to, ground-deployed communication equipment for transmitting signals for flight device, and the relay base station distribution on the mission flight route may include, but is not limited to, one or more relay base stations.

Alternatively, in this embodiment, the above-mentioned control device may include, but is not limited to: equipment with remote control function such as a mobile terminal, a control handle and a computer.

Figure 10:
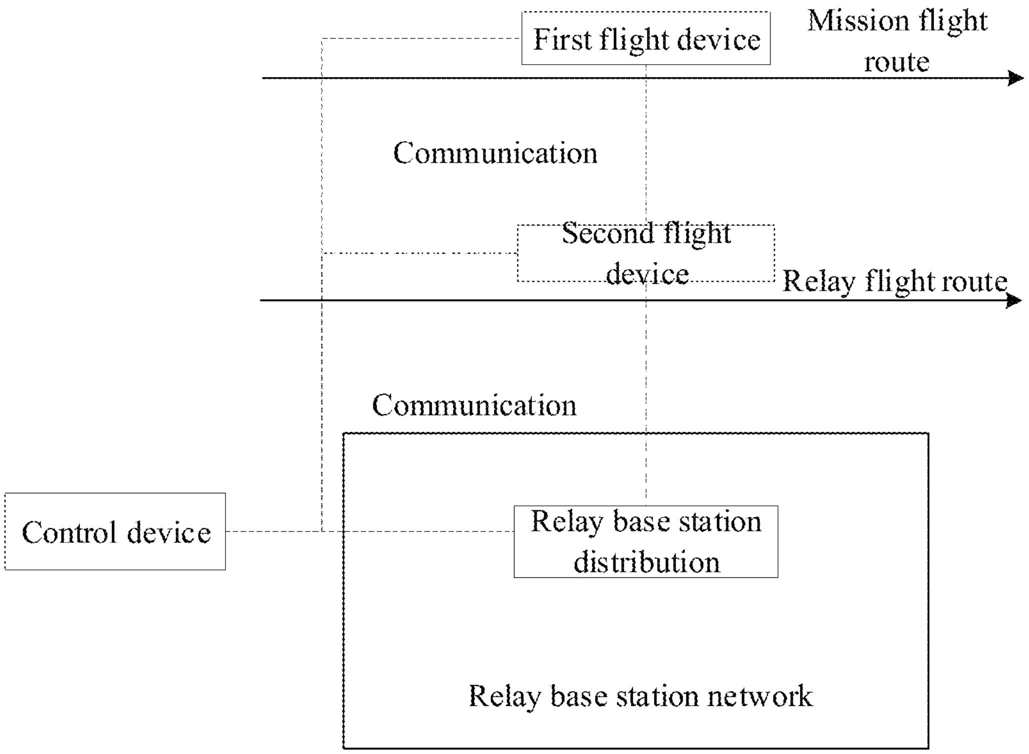
FIG. 10 is a schematic diagram of a system for controlling a flight device according to an embodiment of the present disclosure.

In one embodiment, FIG. 10 is a schematic diagram of a system for controlling a flight device according to an embodiment of the present disclosure. As shown in FIG. 10, the system further includes: a relay base station network, where the relay base station distribution includes relay base stations in the relay base station network which fall within a range where the mission flight route is located, the control device is used for acquiring the relay base station distribution from the relay base station network; and planning the relay flight route according to the mission flight route within a range covered by the relay base station distribution.

In an embodiment, the control device is used for determining a reference relay base station corresponding to each mission position on the mission flight route in the relay base station distribution; determining an optimal relay position corresponding to each mission position within a range covered by the reference relay base station, and obtaining the relay flight route.

In an embodiment, the control device is used for controlling the first flight device and the second flight device to take off simultaneously at the same place; and acquiring mission data transmitted by the target relay base station during execution of the data acquisition mission by the first flight device according to the mission flight route, where the mission data acquired by the first flight device is transmitted to the target relay base station via the second flight device.

In an embodiment, the control device is further used for identifying a base station identifier of the target relay base station during execution of the data acquisition mission by the first flight device according to the mission flight route; and detecting a flight range where the first flight device is located according to the base station identifier.

In an embodiment, the control device is further used for acquiring data state information transmitted by the target relay base station, where the data state information is used for indicating a transmission state of data between the first flight device, the second flight device and the target relay base station during the execution of the data acquisition mission; re-planning the first alternative flight route and the second alternative flight route based on the data state information; controlling the first flight device and the second flight device to continue to perform the data acquisition mission following the first alternative flight route and the second alternative flight route respectively.

In an embodiment, the control device is used for acquiring, from the relay base station distribution, a to-be-tested relay base station which is farthest away from the take-off position of the data acquisition mission; transmitting a test signal to the to-be-tested relay base station; controlling the first flight device and the second flight device to take off simultaneously from the take-off position upon receiving feedback information returned by the to-be-tested relay base station in response to the test signal.

There is also provided in this embodiment an apparatus for controlling a flight device for carrying out the embodiments and preferred embodiments described above, which will not be described in detail. As used below, the term "module" may implement a combination of software and/or hardware for a predetermined function. Although the device described in the following embodiments is preferably implemented in software, implementations in hardware, or a combination of software and hardware, are possible and contemplated.

Figure 11:
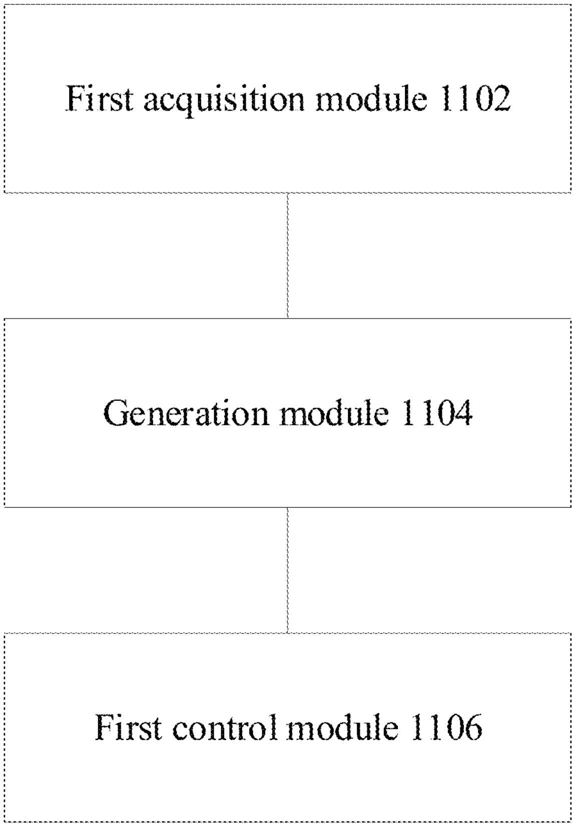
FIG. 11 is a block diagram of an apparatus for controlling a flight device according to an embodiment of the present disclosure.

FIG. 11 is a block diagram of an apparatus for controlling a flight device according to an embodiment of the present disclosure, as shown in FIG. 11, including:

a first acquisition module 1102 configured to acquire a mission flight route of a first flight device, where the mission flight route is used for indicating a flight route of a data acquisition mission to be performed by the first flight device;

a generation module 1104 configured to generate a relay flight route of the second flight device according to the mission flight route and relay base station distribution on the mission flight route, where the relay flight route is used for indicating a flight route of the second flight device during execution of the data acquisition mission by the first flight device; and a control module 1106 configured to control the first flight device to perform the data acquisition mission according to the mission flight route and controlling the second flight device to perform the data acquisition mission according to the relay flight route, where the first flight device is communicatively connected to the second flight device during the execution of the data acquisition mission, and the second flight device is communicatively connected to a target relay base station device in the relay base station distribution.

In an embodiment, the generation module includes:

a first acquisition unit for acquiring a relay base station falling within a range where the mission flight route is located from a relay base station network to obtain the relay base station distribution; and a first planning unit for planning the relay flight route according to the mission flight route within a range covered by the relay base station distribution.

In an embodiment, the first planning unit is used for determining a reference relay base station corresponding to each mission position on the mission flight route in the relay base station distribution; and determining an optimal relay position corresponding to each mission position within a range covered by the reference relay base station, and obtaining the relay flight route.

In one embodiment, the first control module includes:

a first control unit for controlling the first flight device and the second flight device to take off simultaneously at the same place; and a second acquisition unit for acquiring mission data transmitted by the target relay base station during execution of the data acquisition mission by the first flight device according to the mission flight route, where the mission data acquired by the first flight device is transmitted to the target relay base station via the second flight device.

In an embodiment, the device further includes:

an identification module configured to identify a base station identifier of the target relay base station in the process of the first flight device executing the data acquisition mission according to the mission flight route;

a detection module configured to detect a flight range where the first flight device is located according to the base station identifier.

In an embodiment, the device further includes:

a second acquisition module configured to acquire data state information transmitted by the target relay base station, where the data state information is used for indicating a transmission state of data between the first flight device, the second flight device and the target relay base station during the execution of the data acquisition mission;

a planning module configured to re-plan the first alternative flight route and the second alternative flight route based on the data state information; and a control module configured to control the first flight device and the second flight device to continue to perform the data acquisition mission following the first alternative flight route and the second alternative flight route respectively.

In an embodiment, the device further includes:

a third acquisition module configured to acquire a to-be-tested relay base station which is farthest away from the take-off position of the data acquisition mission from the relay base station distribution in the process that the first flight device executes the data acquisition mission according to the mission flight route;

a transmission module configured to transmit a test signal to the to-be-tested relay base station;

a control module configured to control the first flight device and the second flight device to take off simultaneously from the take-off position upon receiving feedback information returned by the to-be-tested relay base station in response to the test signal.

It should be noted that each of the above-mentioned modules can be implemented by software or hardware, and for the latter, it can be implemented by, but not limited to: the above-mentioned modules are all located in the same processor; alternatively, the various modules may reside in different processors in any combination.

Embodiments of the present disclosure also provide a computer-readable storage medium having stored therein a computer program, where the computer program is arranged to perform the steps of any of the method embodiments described above when run on.

In this embodiment, the computer-readable storage medium may be configured to store a computer program for performing the following steps:

S1: acquiring a mission flight route of a first flight device, where the mission flight route is used for indicating a flight route of a data acquisition mission to be performed by the first flight device;

S2: generating a relay flight route of the second flight device according to the mission flight route and relay base station distribution on the mission flight route, where the relay flight route is used for indicating a flight route of the second flight device during execution of the data acquisition mission by the first flight device; and S3: controlling the first flight device to perform the data acquisition mission according to the mission flight route and controlling the second flight device to perform the data acquisition mission according to the relay flight route, where the first flight device is communicatively connected to the second flight device during the execution of the data acquisition mission, and the second flight device is communicatively connected to a target relay base station device in the relay base station distribution.

In an embodiment, the computer-readable storage medium may include, but is not limited to: a USB disk, a Read-Only Memory (ROM), a Random Access Memory (RAM), a removable hard disk, a magnetic or optical disk that can store computer programs.

Embodiments of the present disclosure also provide an electronic device including a memory and a processor, the memory having stored therein a computer program, the processor being arranged to run the computer program to perform the steps in any of the method embodiments described above.

In an embodiment, the electronic device may further include a transmission device coupled to the processor and an input output device coupled to the processor.

In an embodiment, the processor may be arranged to perform the following steps by means of a computer program:

S1: acquiring a mission flight route of a first flight device, where the mission flight route is used for indicating a flight route of a data acquisition mission to be performed by the first flight device;

S2: generating a relay flight route of the second flight device according to the mission flight route and relay base station distribution on the mission flight route, where the relay flight route is used for indicating a flight route of the second flight device during execution of the data acquisition mission by the first flight device; and S3: controlling the first flight device to perform the data acquisition mission according to the mission flight route and controlling the second flight device to perform the data acquisition mission according to the relay flight route, where the first flight device is communicatively connected to the second flight device during the execution of the data acquisition mission, and the second flight device is communicatively connected to a target relay base station device in the relay base station distribution.

In the embodiments of the present disclosure, firstly, a mission flight route of a first flight device which is to perform a data acquisition mission is acquired, and relay base station distribution is provided on the mission flight route; then a flight route is generated as a relay flight route for a second flight device according to the mission flight route and the relay base station distribution on the mission flight route; and finally, the first flight device and the second flight device are controlled to perform the data acquisition mission according to respective flight routes. During the execution of the data acquisition mission, a communication connection is made between the first flight device and the second flight device, and the communication connection is made between the second flight device and the target relay base station equipment in the relay base station distributions to form a network for data transmission and communication to ensure the back transmission of information during the execution of the data acquisition mission. In the process of controlling the first flight device to perform the data acquisition mission, the effect of extending the transmission distance of the first flight device is achieved by using the second flight device and the relay base station to transmit the data information, and since the second flight device cooperates with the first flight device to perform the relay transmission of the data information during the data acquisition mission, the restriction on the flight route of the first flight device by the relay base station is reduced. Therefore, the problem of small communication coverage of the flight device can be solved, and the effect of extending the communication coverage of the flight device can be achieved.

Specific examples in this embodiment may refer to the examples described in the above embodiments and embodiments, and this embodiment will not be described in detail herein.

It will be apparent to a person skilled in the art that the modules or steps of the present disclosure described above may be implemented by general purpose computing devices, may be centralized on a single computing device, or may be distributed over a network of a plurality of computing devices, may be implemented in program code executable by the computing devices, may be stored in a storage device for execution by the computing devices, and in some instances, the steps shown or described may be performed in an order other than that described herein, or may be separately fabricated into integrated circuit modules, or a plurality of modules or steps thereof may be implemented as a single integrated circuit module. As such, the present disclosure is not limited to any particular combination of hardware and software.

The above description is only a preferred embodiment of the present disclosure and is not intended to limit the present disclosure, and various modifications and changes may be made to the present disclosure by a person skilled in the art. Any modification, equivalent replacement, or improvement made within the principle of the present disclosure shall be included in the protection scope of the present disclosure.

What is claim is:

1. A control method for flight device, comprising:

acquiring a mission flight route of a first flight device, wherein the mission flight route is configured to indicate a flight route of a data acquisition mission to be performed by the first flight device;

generating a relay flight route of a second flight device, according to the mission flight route of the first flight device, and a relay base station distribution on the mission flight route of the first flight device, wherein the relay flight route is configured to indicate a flight route of the second flight device during execution of the data acquisition mission by the first flight device; and controlling the first flight device to perform the data acquisition mission according to the mission flight route and controlling the second flight device to perform the data acquisition mission according to the relay flight route, wherein the first flight device is communicatively connected to the second flight device during the execution of the data acquisition mission, and the second flight device is communicatively connected to a target relay base station device in the relay base station distribution;

wherein generating the relay flight route of the second flight device according to the mission flight route and the relay base station distribution on the mission flight route comprises:

determining a plurality of reference relay base stations in the relay base station distribution, wherein each of the plurality of reference relay base stations corresponds to a mission position on the mission flight route of the first flight device;

determining a plurality of optimal relay positions, wherein each of the plurality of optimal relay positions is determined within a range covered by a reference relay base station of the plurality of reference relay base stations; and obtaining the relay flight route of the second flight device by connecting the plurality of optimal relay positions.

2. The control method according to claim 1, wherein generating the relay flight route of the second flight device according to the mission flight route and the relay base station distribution on the mission flight route further comprises:

acquiring a relay base station falling within a range where the mission flight route is located from a relay base station network to obtain the relay base station distribution.

3. The control method according to claim 1, wherein controlling the first flight device to perform the data acquisition mission according to the mission flight route and controlling the second flight device to perform the data acquisition mission according to the relay flight route further comprises:

controlling the first flight device and the second flight device to take off simultaneously at the same place; and acquiring mission data transmitted by the target relay base station during the execution of the data acquisition mission by the first flight device according to the mission flight route, wherein the mission data acquired by the first flight device is transmitted to the target relay base station via the second flight device.

4. The control method according to claim 3, wherein during the execution of the data acquisition mission by the first flight device according to the mission flight route, the control method further comprises:

identifying a base station identifier of the target relay base station; and detecting a flight range where the first flight device is located according to the base station identifier.

5. The control method according to claim 3, wherein during the execution of the data acquisition mission by the first flight device according to the mission flight route, the control method further comprises:

acquiring data state information transmitted by the target relay base station, wherein the data state information is configured to indicate a transmission state of data among the first flight device, the second flight device and the target relay base station during the execution of the data acquisition mission;

re-planning to obtain a first alternative flight route and a second alternative flight route based on the data state information; and controlling the first flight device and the second flight device to continue to perform the data acquisition mission following the first alternative flight route and the second alternative flight route respectively.

6. The control method according to claim 3, wherein controlling the first flight device and the second flight device to take off simultaneously at the same place comprises:

acquiring, from the relay base station distribution, a to-be-tested relay base station which is the farthest away from a take-off position of the data acquisition mission;

transmitting a test signal to the to-be-tested relay base station; and controlling the first flight device and the second flight device to take off simultaneously from the take-off position upon receiving feedback information returned by the to-be-tested relay base station in response to the test signal.

7. A control system for a flight device, comprising:

a control device, a first flight device, a second flight device and a relay base station distribution, wherein the first flight device is communicatively connected to the second flight device during execution of a data acquisition mission; and wherein the second flight device is communicatively connected to a target relay base station device in the relay base station distribution;

wherein the control device is configured to acquire a mission flight route of a first flight device, wherein the mission flight route is configured to indicate a flight route of the data acquisition mission to be performed by the first flight device;

generate a relay flight route of the second flight device, according to the mission flight route of the first flight device, and the relay base station distribution on the mission flight route of the first flight device, wherein the relay flight route is configured to indicate a flight route of the second flight device during execution of the data acquisition mission by the first flight device; and control the first flight device to perform the data acquisition mission according to the mission flight route and controlling the second flight device to perform the data acquisition mission according to the relay flight route;

wherein the first flight device is configured to acquire mission data during the execution of the data acquisition mission;

wherein the second flight device is configured to transmit the mission data acquired by the first flight device;

wherein the target relay base station is configured to transmit the mission data transmitted by the second flight device; and wherein the control device is further configured to perform following steps to generate the relay flight route of the second flight device:

determine a plurality of reference relay base stations in the relay base station distribution, wherein each of the plurality of reference relay base stations corresponds to a mission position on the mission flight route of the first flight device;

determine a plurality of optimal relay positions, wherein each of the plurality of optimal relay positions is determined within a range covered by a reference relay base station of the plurality of reference relay base stations; and obtain the relay flight route of the second flight device by connecting the plurality of optimal relay positions.

8. The system according to claim 7, further comprising: a relay base station network, wherein the relay base station distribution comprises a plurality of relay base stations in the relay base station network which fall within a range where the mission flight route is located; and the control device is configured to acquire the relay base station distribution from the relay base station network; and plan the relay flight route according to the mission flight route within a range covered by the relay base station distribution.

9. The system according to claim 7, wherein the control device is further configured to:

control the first flight device and the second flight device to take off simultaneously at the same place; and acquire mission data transmitted by the target relay base station during execution of the data acquisition mission by the first flight device according to the mission flight route, wherein the mission data acquired by the first flight device is transmitted to the target relay base station via the second flight device.

10. The system according to claim 9, wherein the control device is further configured to:

identify a base station identifier of the target relay base station; and detect a flight range where the first flight device is located according to the base station identifier.

11. The system according to claim 9, wherein the control device is further configured to:

acquire data state information transmitted by the target relay base station, wherein the data state information is configured to indicate a transmission state of data among the first flight device, the second flight device and the target relay base station during the execution of the data acquisition mission;

re-plan to obtain a first alternative flight route and a second alternative flight route based on the data state information; and control the first flight device and the second flight device to continue to perform the data acquisition mission following the first alternative flight route and the second alternative flight route respectively.

12. The system according to claim 9, wherein the control device is further configured to:

acquire, from the relay base station distribution, a to-be-tested relay base station which is the farthest away from a take-off position of the data acquisition mission;

transmit a test signal to the to-be-tested relay base station; and control the first flight device and the second flight device to take off simultaneously from the take-off position upon receiving feedback information returned by the to-be-tested relay base station in response to the test signal.

13. A non-transitory computer-readable storage medium having stored therein a computer program, wherein the computer program, when executed by a processor, causes the processor to perform steps comprising:

acquiring a mission flight route of a first flight device, wherein the mission flight route is configured to indicate a flight route of a data acquisition mission to be performed by the first flight device;

generating a relay flight route of a second flight device, according to the mission flight route of the first flight device, and a relay base station distribution on the mission flight route of the first flight device, wherein the relay flight route is configured to indicate a flight route of the second flight device during execution of the data acquisition mission by the first flight device; and controlling the first flight device to perform the data acquisition mission according to the mission flight route and controlling the second flight device to perform the data acquisition mission according to the relay flight route, wherein the first flight device is communicatively connected to the second flight device during the execution of the data acquisition mission, and the second flight device is communicatively connected to a target relay base station device in the relay base station distribution;

wherein generating the relay flight route of the second flight device according to the mission flight route and the relay base station distribution on the mission flight route comprises:

determining a plurality of reference relay base stations in the relay base station distribution, wherein each of the plurality of reference relay base stations corresponds to a mission position on the mission flight route of the first flight device;

determining a plurality of optimal relay positions, wherein each of the plurality of optimal relay positions is determined within a range covered by a reference relay base station of the plurality of reference relay base stations; and obtaining the relay flight route of the second flight device by connecting the plurality of optimal relay positions.

14. The non-transitory computer-readable storage medium according to claim 13, wherein the processor is caused to perform steps further comprising:

acquiring a relay base station falling within a range where the mission flight route is located from a relay base station network to obtain the relay base station distribution.

15. The non-transitory computer-readable storage medium according to claim 13, wherein the processor is caused to perform steps further comprising:

controlling the first flight device and the second flight device to take off simultaneously at the same place; and acquiring mission data transmitted by the target relay base station during the execution of the data acquisition mission by the first flight device according to the mission flight route, wherein the mission data acquired by the first flight device is transmitted to the target relay base station via the second flight device.

16. The non-transitory computer-readable storage medium according to claim 15, wherein the processor is caused to perform steps further comprising:

identifying a base station identifier of the target relay base station; and detecting a flight range where the first flight device is located according to the base station identifier.

17. The non-transitory computer-readable storage medium according to claim 15, wherein the processor is caused to perform steps further comprising:

acquiring data state information transmitted by the target relay base station, wherein the data state information is configured to indicate a transmission state of data among the first flight device, the second flight device and the target relay base station during the execution of the data acquisition mission;

re-planning to obtain a first alternative flight route and a second alternative flight route based on the data state information; and controlling the first flight device and the second flight device to continue to perform the data acquisition mission following the first alternative flight route and the second alternative flight route respectively.

18. The non-transitory computer-readable storage medium according to claim 15, wherein the processor is caused to perform steps further comprising:

acquiring, from the relay base station distribution, a to-be-tested relay base station which is the farthest away from a take-off position of the data acquisition mission;

transmitting a test signal to the to-be-tested relay base station; and controlling the first flight device and the second flight device to take off simultaneously from the take-off position upon receiving feedback information returned by the to-be-tested relay base station in response to the test signal.

* * * * *